United States Patent [19]

Nesbitt

[11] Patent Number: 4,805,315

[45] Date of Patent: Feb. 21, 1989

[54] FREE STANDING SQUARING TOOL WITH OPEN CORNERS

[76] Inventor: Hugh M. Nesbitt, R.R. 1, Box 414, Lyndhurst, Va. 22459

[21] Appl. No.: 162,216

[22] Filed: Feb. 29, 1988

[51] Int. Cl.⁴ ............ G01B 5/00

[52] U.S. Cl. ............ 33/535; 33/403; 33/474; 33/481; 33/613; 52/657; 248/248; 269/41; 269/910

[58] Field of Search ............ 33/535, 474, 481, 482, 33/562, 613, 403, 404; 269/910, 905, 904, 37, 41; 52/698, 657, DIG. 6; 248/235, 247, 248

[56] References Cited

U.S. PATENT DOCUMENTS

| | | | |
|---|---|---|---|
| 513,665 | 1/1894 | Barberie . | |
| 555,614 | 3/1896 | Mowrer . | |
| 1,471,159 | 10/1923 | Howie et al. | 52/657 X |
| 2,205,339 | 6/1940 | Blessing | 33/613 |
| 2,408,852 | 10/1946 | Holman et al. | 52/657 |
| 2,606,583 | 8/1952 | O'Connor . | |
| 2,835,978 | 5/1958 | Krisel . | |
| 2,941,557 | 6/1960 | Baprawski . | |
| 3,328,890 | 7/1967 | Fagerberg, Sr. . | |
| 3,854,268 | 12/1974 | Gutner | 52/657 X |

FOREIGN PATENT DOCUMENTS

| | | | |
|---|---|---|---|
| 746466 | 11/1932 | France | 248/247 |
| 428473 | 5/1935 | United Kingdom | 248/248 |

*Primary Examiner*—William D. Martin, Jr.
*Attorney, Agent, or Firm*—Hoffman, Wasson, Fallow & Gitler

[57] ABSTRACT

A fixture for holding workpieces at predetermined angles while they are being interconnected includes a pair of legs and a hypotenuse forming a right triangle, whose three vertices are truncated to enable the fixture to function as a jig, as a template, or as a bending tool. Workpieces may easily be attached to the fixture, obviating the need for special clamps.

6 Claims, 1 Drawing Sheet

FREE STANDING SQUARING TOOL WITH OPEN CORNERS

BACKGROUND

This invention relates to jigs and fixtures, and more particularly to a device for holding workpieces in perpendicular or oblique apposition while they are being joined together.

The prior art is replete with templates, guides and clamps for positioning workpieces to be joined. Such devices are useful in carpentry, welding and masonry industries, among others. Generally pertinent prior art includes the following U.S. Pats. Nos.: 513,665; 555,614; 2,606,583; 2,835,978; 2,941,557; 3,328,890.

None of the above, however, can conveniently hold elongate members such as two-by-fours or metal bar stock—special clamps or the like being required for such purposes.

It is therefore an object of the invention to provide a simple and robust fixture especially useful for holding and positioning elongate members to be joined.

Another object is to create a fixture having substantial width to facilitate the clamping of members thereto.

Yet another object is to provide a fixture with truncated corners so that metal can be bent around the fixture without producing sharp edges or bends in the metal. A related object is to enable one to produce a welded/soldered bead at an internal corner of apposed workpieces.

A further object is provide a fixture that can be used in corners having obstructions such as molding.

SUMMARY OF THE INVENTION

A triangular squaring tool according to the invention has a pair of perpendicular legs, interconnected by an oblique bridge. A pair of end portions, one on each of the legs, extends obliquely from its respective leg, and a hypotenuse member interconnects the end portions, the hypotenuse member being oblique to each of the legs and parallel to the bridge. The legs, bridge, end portions and hypotenuse member define a polygon lying in a plane, and width of each of the members extends perpendicular thereto. In the preferred form, the polygon is a right isoceles triangle whose vertices are truncated to enable the fixture to function as a jig, template or bending tool.

BRIEF DESCRIPTION OF THE DRAWINGS

In the accompanying drawing.

DESCRIPTION OF THE PREFERRED EMBODIMENT

Figure 1:
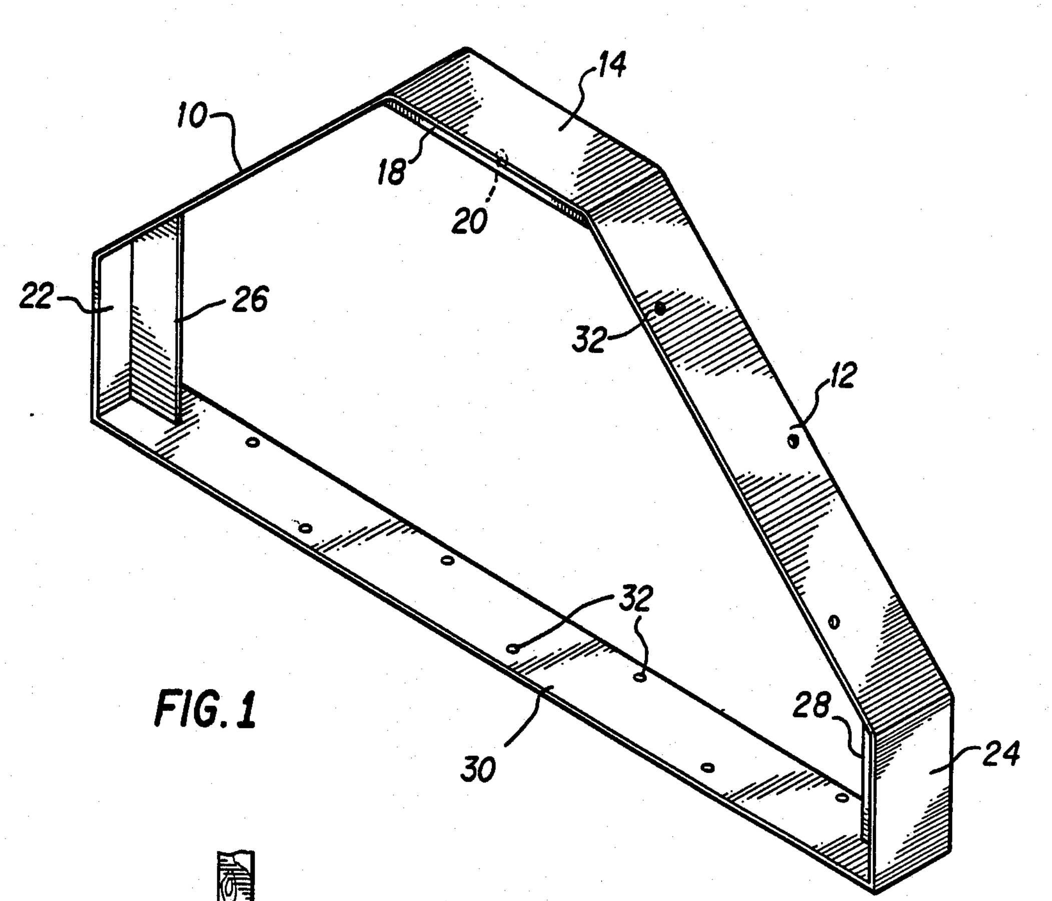
FIG. 1 is a perspective view of a fixture embodying the invention.

FIG. 1 shows a preferred fixture embodying the invention. The fixture, generally in the shape of a right isosceles triangle with all three vertices truncated, comprises symmetrical first and second legs 10,12 formed from strip stock whose width extends perpendicular to the plane of the triangle. In the claims that follow, by "width" of the strip stock is meant its greater transverse dimension. The legs' lengths are perpendicular to one another; however, the legs do not intersect, but rather are joined by a relatively shorter bridge 14 which makes a 135° angle with each leg. A gusset 18, lying in the plane of the triangle, is welded between the members 10,12 and 14; hole 20, by which the fixture may be hung, extends through the gusset 18 at its midpoint.

The legs 10,12 are bent inwardly 45° near their ends, thus defining end portions 22,24 which are reinforced by gussets 26,28. I prefer to form the legs 10,12, the bridge 14, as well as the end portions 22,24 from a single piece of steel strip stock, but other materials and forming methods may be desirable in various circumstances, and their implementation is within the skill of the artisan.

The end portions parallel one another, and each lies perpendicular to the plane of the bridge 14. The tips of the end portions are interconnected by a hypotenuse member 30, welded thereto at either of its extremes. The gussets may be welded to the hypotenuse member, as well. The gussetting makes the fixture robust and able to survive rought handling. Inasmuch as the two legs are of equal length, as are the end portions, the hypotenuse member is parallel to the bridge 14, and subtends an angle of 45° with either of the legs. For a fixture having a twenty-four inch hypotenuse, I prefer to use stock two inches wide by 0.100 inch thick, but a wide range of variations is of course possible, depending on the intended usage.

The legs 10,12 and hypotenuse member 30 preferably have through holes 32 at intervals, as shown. These holes may be used to attach workpieces to the fixture, as described below.

Figure 2:
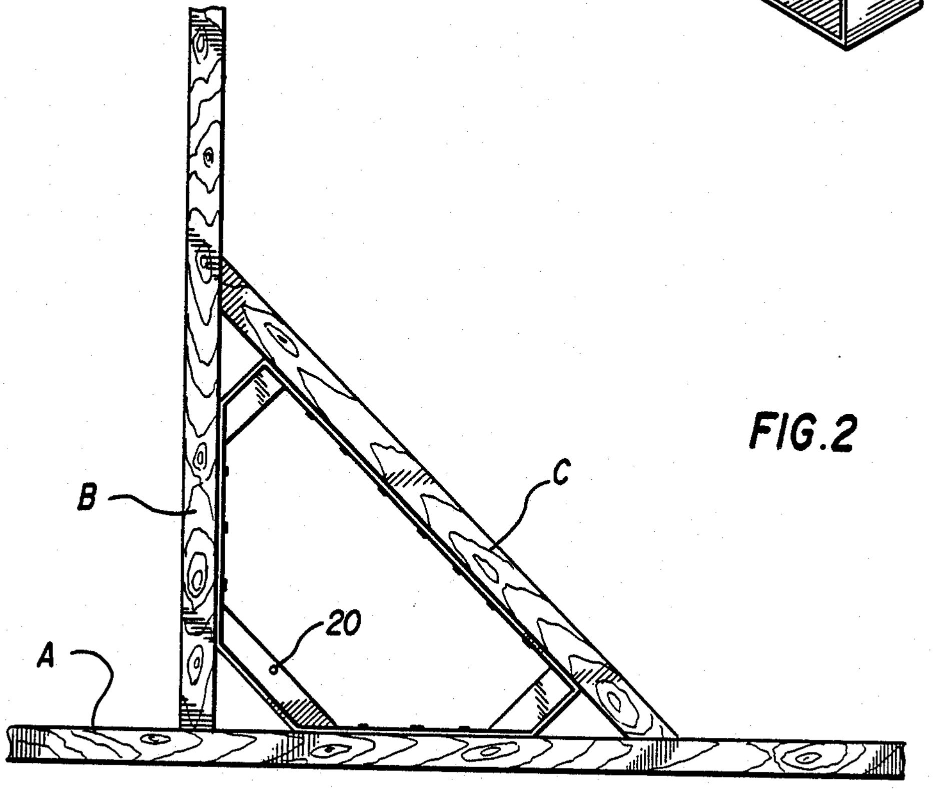
FIG. 2 is a front elevation of the fixture in use.

The fixture will find many uses, one of which is illustrated in FIG. 2. In this instance, three two-by-fours are held in position by nailing, screwing or clamping to the legs and hypotenuse of the fixture. Thus, the members A and B are held accurately perpendicular, with the brace C running at 45° between them. The fixture supports the members until they have been permanently joined to one another, whereafter it is removed.

One may use the fixture as a jig to hold metal members in position during welding, and as a guide for laying tile at a 45° angle to the walls of a room. It is also useful for bending metal members to 90° or45° angles. For this purpose, the truncation of the triangle's vertices avoids presenting sharp corners that would prevent the formation of a smooth bend in the workpiece. Numerous other uses will occur to those of skill in the art.

The invention is subject to variations from the geometry described above. For example, the hypotenuse could extend at an angle other than 45° to the legs. The invention should therefore be measured by the following claims, with the embodiment described being regarded only as illustrative.

I claim:

1. A fixture comprising
   - a pair of mutually perpendicular legs,
   - a bridge interconnecting said legs, said bridge extending obliquely to each of said legs,
   - a pair of end portions, one on each of said legs, each end portion extending obliquely to its respective leg, and
   - a hypotenuse member extending between said end portions, the hypotenuse member being oblique to each of said legs,
   - said legs, bridge, end portions and hypotenuse member defining a polygon lying in a plane, each of said legs, bridge, end portions and hypotenuse member being disposed with its width extending perpendicular to said plane.

2. The invention of claim 1, further comprising a first gusset connected between the bridge and each of said legs.

3. The invention of claim 2, wherein said first gusset is attached at the middle of the width of the members to which it is attached.

4. The invention of claim 2, further comprising second and third gussets, each connected between one of said legs, a respective end portion, and said hypotenuse member.

5. The invention of claim 4, wherein each of said second and third gussets is attached at the middle of the width of the members to which it is attached.

6. The invention of claim 1, wherein said legs and said hypotenuse member each have plural through holes by which workpieces may be attached to the fixture.

* * * * *